(12) United States Patent
Kuo et al.

(10) Patent No.: US 9,470,874 B2
(45) Date of Patent: Oct. 18, 2016

(54) FIXED-FOCUS LENS (71) Applicant: Coretronic Corporation, Hsin-Chu (TW)

(72) Inventors: Tao-Hung Kuo, Hsin-Chu (TW);
Tzu-Yuan Lin, Hsin-Chu (TW);
Ching-Chuan Wei, Hsin-Chu (TW);
Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/876,824

(22) Filed: Oct. 7, 2015

(65) Prior Publication Data
US 2016/0202452 A1 Jul. 14, 2016

(30) Foreign Application Priority Data
Jan. 9, 2015 (TW) .............................. 104100761 A (51) Int. Cl.
*G02B 9/04* (2006.01)
*G02B 9/60* (2006.01)
*G02B 1/04* (2006.01)
*G02B 13/18* (2006.01)
*G02B 27/00* (2006.01)
*G02B 13/04* (2006.01)

(52) U.S. Cl.
CPC ................ *G02B 9/60* (2013.01); *G02B 1/041* (2013.01); *G02B 13/04* (2013.01); *G02B 13/18* (2013.01); *G02B 27/0025* (2013.01)

(58) Field of Classification Search
CPC ........ G02B 9/60; G02B 13/04; G02B 13/18; G02B 1/041; G02B 27/0025; G02B 9/64; G02B 9/04; G02B 9/06
See application file for complete search history.

(56) References Cited

U.S. PATENT DOCUMENTS

| 6,404,564 | B1 | 6/2002 | Yamada |
| 8,786,957 | B2 | 7/2014 | Sanjo et al. |
| 9,063,318 | B2 * | 6/2015 | Ishizaka ............. G02B 13/0045 |

FOREIGN PATENT DOCUMENTS

| CN | 100458488 | 2/2009 |
| TW | I427352 | 2/2014 |
| TW | I445997 | 7/2014 |

* cited by examiner

*Primary Examiner* — Joseph P Martinez
(74) *Attorney, Agent, or Firm* — Jianq Chyun IP Office (57) ABSTRACT

A fixed-focus lens including a first lens group, a second lens group and an aperture stop is provided. The first lens group has a positive refractive power, and includes a first lens, a second lens and a third lens arranged in sequence from a magnified side to a reduced side. The second lens group has a positive refractive power, and includes a fourth lens, a fifth lens, a sixth lens and a seventh lens arranged in sequence from the magnified side to the reduced side. A product of a refractive power and a slope of a refractive index changing with a temperature change of any one lens of the second lens group is P×(dn/dt), and a sum of P×(dn/dt) of the lenses of the second lens group is less than 0. The aperture stop is disposed between the first lens group and the second lens group.

16 Claims, 8 Drawing Sheets

FIXED-FOCUS LENS

CROSS-REFERENCE TO RELATED APPLICATION

This application claims the priority benefit of Taiwan application serial no. 104100761, filed on Jan. 9, 2015. The entirety of the above-mentioned patent application is hereby incorporated by reference herein and made a part of this specification.

BACKGROUND OF THE INVENTION

1. Field of the Invention

The invention generally relates to a lens, and more particularly to a fixed-focus lens.

2. Description of Related Art

With advances in optical-electronic technologies, image apparatuses such as digital video cameras (DVC), projectors and digital cameras (DC) have been widely applied in daily life. Lens is one of core elements in the image apparatus, and configured to display images clearly on a screen or a charge coupled device (CCD). In case the image apparatus are applied in specific fields, a wide angle lens is adopted to increase a field of view (FOV). For instance, the wide angle lens is required in use of a car back-up camera, a driving assistance camera, or a security surveillance camera.

In recent years, with rapid developments of LED light source technology and digital light processing (DLP) technology, miniaturizing and lightening of the projectors have become a mainstream in product design. Further, it is a direction in which future researches can well invest as how to effectively reduce a size of an optical lens while providing both characteristics of large aperture and wide viewing angle. In addition, it is also an important consideration for the industry in development as how to reduce manufacturing costs with drastic competitions in the market while maintaining the effect of projecting large size and clear picture in limited space.

On the other hand, the conventional mini projectors on the market are prone to produce a thermal drift phenomenon because the limited heat dissipation due to restrictions of the volume of the mini projector. Therefore, in order to ensure imaging quality of the lenses, a working temperature of the mini projectors is often restricted within a narrow range.

U.S. Pat. No. 6,404,564 discloses a projection lens having two lens groups. When a distance between a projection screen end and the projection lens changes, a first lens group and a second lens group must move together to provide a projection picture with wide viewing angle. Such architecture requires a relatively complex mechanism design in which a volume of the lens is larger.

Taiwan Patent No. 1427352 discloses a fixed-focus lens. The fixed-focus lens is disposed between a magnified side and a reduced side and includes a first lens group and a second lens group arranged in sequence from the magnified side to the reduced side. The first lens group includes an aspheric lens. The second lens group having a positive refractive power is disposed between the first lens group and the reduced side, and includes an aspheric lens.

Taiwan Patent No. 1445997 discloses a fixed-focus lens. The fixed-focus lens is disposed between an object side and an image side, where the image side has an imaging surface. The fixed-focus lens includes a first lens group and a second lens group, where the first lens group is adjacent to the object side and the second lens group is adjacent to the image side.

U.S. Pat. No. 8,786,957 discloses a lens system, in which refractive powers of a third lens, a first sub lens and a second sub lens and a coefficient dn/dt satisfy a specific mathematical relation. Therein, dn/dt represents a variation of refractive index due to a temperature variation (e.g., within a range from −20° C. to 40° C.).

The information disclosed in this section is only for enhancement of understanding of the DESCRIPTION OF RELATED ART section of the described technology and therefore it may contain information that does not form the prior art that is already known to a person of ordinary skill in the art. Further, the information disclosed in the DESCRIPTION OF RELATED ART section does not mean that one or more problems to be resolved by one or more embodiments of the invention was acknowledged by a person of ordinary skill in the art.

SUMMARY OF THE INVENTION

The invention is directed to a fixed-focus lens having low manufacturing cost and high temperature tolerance.

Other objectives and advantages of the invention can be further illustrated by the technical features broadly embodied and described as follows.

To achieve one, a part, or all of the above advantages or other advantages, a fixed-focus lens is proposed according to an embodiment of the invention. The fixed-focus lens includes a first lens group, a second lens group and an aperture stop. The first lens group has a positive refractive power, and includes a first lens, a second lens and a third lens arranged in sequence from a magnified side to a reduced side. The second lens group has a positive refractive power, and includes a fourth lens, a fifth lens, a sixth lens and a seventh lens arranged in sequence from the magnified side to the reduced side. A product of a refractive power and a slope of a refractive index changing with a temperature change of any one lens of the second lens group is P×(dn/dt), and a sum of P×(dn/dt) of the lenses of the second lens group is less than 0. The aperture stop is disposed between the first lens group and the second lens group.

In an embodiment of the invention, refractive powers of the first lens, the second lens, and the third lens are sequentially negative, negative and positive.

In an embodiment of the invention, refractive powers of the fourth lens, the fifth lens, the sixth lens and the seventh lens are sequentially positive, negative, positive and positive.

In an embodiment of the invention, the fixed-focus lens satisfies 5<|f1/f|<9, where f1 is an effective focal length of the first lens group, and f is an effective focal length of the fixed-focus lens.

In an embodiment of the invention, the fixed-focus lens satisfies 2<|f2/f|<3.5, where f2 is an effective focal length of the second lens group, and f is an effective focal length of the fixed-focus lens.

In an embodiment of the invention, at least one of the first lens, the second lens and the third lens is an aspheric lens, and at least one of the fourth lens, the fifth lens, the sixth lens and the seventh lens is an aspheric lens.

In an embodiment of the invention, a material of at least one of the first lens, the second lens and the third lens is plastic.

In an embodiment of the invention, one closest to the aperture stop among the lenses of the first lens group is a spheric lens having a refractive index greater than 1.8 and an abbe number less than 35.

In an embodiment of the invention, one closest to the aperture stop among the lenses of the second lens group is an aspheric lens.

In an embodiment of the invention, a material of one closest to the aperture stop among the lenses of the second lens group is glass.

In an embodiment of the invention, the lenses having the refractive powers being negative have a refractive index greater than 1.75 and an abbe number less than 35 in the second lens group.

In an embodiment of the invention, the fifth lens and the sixth lens form a double cemented lens.

In an embodiment of the invention, the first lens is a convex-concave lens with a convex surface facing the magnified side, the second lens is a convex-concave lens with a convex surface facing the magnified side, the third lens is a biconvex lens, the fourth lens is a concave-convex lens with a convex surface facing the reduced side, the fifth lens is a biconcave lens, the sixth lens is a biconvex lens, and the seventh lens is a biconvex lens.

In an embodiment of the invention, the first lens is a convex-concave lens with a convex surface facing the magnified side, the second lens is a biconcave lens, the third lens is a biconvex lens, the fourth lens is a concave-convex lens with a convex surface facing the reduced side, the fifth lens is a biconcave lens, the sixth lens is a biconvex lens, and the seventh lens is a biconvex lens.

In an embodiment of the invention, the first lens and the fourth lens are aspheric lenses.

In an embodiment of the invention, the second lens is an aspheric lens.

Based on the above, the embodiments of the invention may achieve at least one of advantages or effects as listed below. The fixed-focus lens according to the embodiments of the invention satisfies $5<|f1/f|<9$ and $2<|f2/f|<3.5$, where f1 is the effective focal length of the first lens group, f2 is the effective focal length of the second lens group, and f is the effective focal length of the fixed-focus lens. In the embodiments of the invention, the product of the refractive power and the slope of the refractive index changing with the temperature change of any one lens of the second lens group is $P \times (dn/dt)$, where the sum of $P \times (dn/dt)$ of the lenses is less than 0. As such, the effects of wider field of view and large aperture may also be achieved while maintaining the imaging quality in high resolution in addition to the characteristics of miniaturizing and lightening of the lens. Moreover, the fixed-focus lens may also utilize the selection and the collocation of materials of the lenses of the second lens group to inhibit the thermal drift phenomenon from influencing optical performance of the fixed-focus lens.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
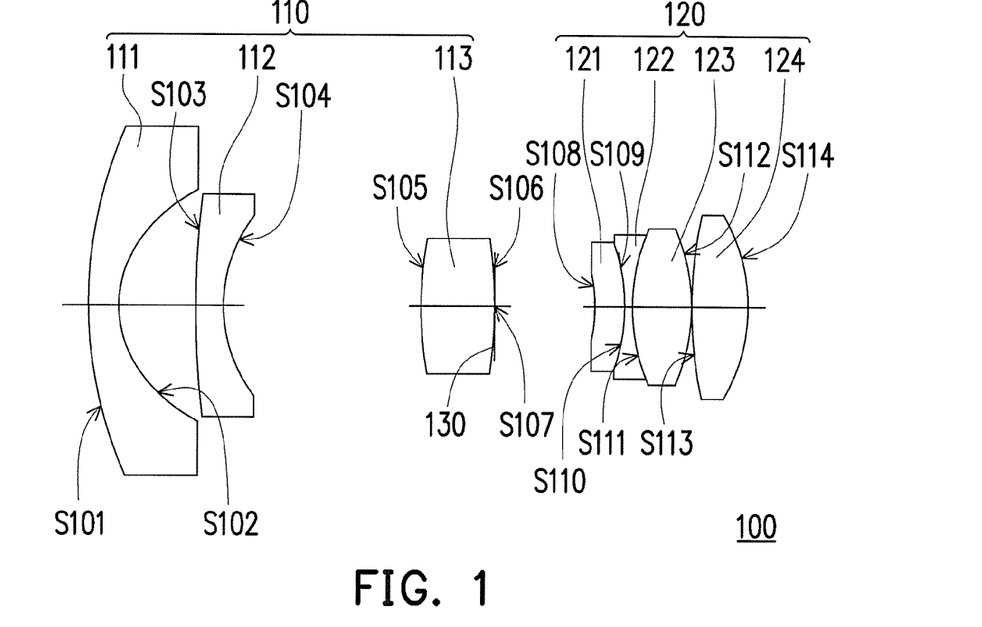
FIG. 1 is a schematic diagram of a fixed-focus lens according to an embodiment of the invention.

FIG. 1 is a schematic diagram of a fixed-focus lens according to an embodiment of the invention. Referring to FIG. 1, in the embodiment, a fixed-focus lens 100 includes a first lens group 110, a second lens group 120 and an aperture stop 130. The first lens group 110 has a positive refractive power, and includes a first lens 111, a second lens 112 and a third lens 113 arranged in sequence from a magnified side to a reduced side. Herein, refractive powers of the first lens 111, the second lens 112, and the third lens 113 are sequentially negative, negative and positive. The second lens group 120 has a positive refractive power, and includes a fourth lens 121, a fifth lens 122, a sixth lens 123 and a seventh lens 124 arranged in sequence from the magnified side to the reduced side. Further, the aperture stop 130 is disposed between the first lens group 110 and the second lens group 120.

More specifically, in the embodiment, at least one of the first lens 111, the second lens 112 and the third lens 113 is an aspheric lens. For instance, the first lens 111 and the second lens 112 are the aspheric lens, and a material thereof may be plastic. Accordingly, by selecting plastic as the material of the aspheric lens of the first lens group 110 in the embodiment, weight and volume of the fixed-focus lens 100 may be effectively reduced. Spheric aberration and distortion of the fixed-focus lens 100 may also be effectively controlled to provide favorable imaging quality.

On the other hand, in the embodiment, at least one of a fourth lens 121, a fifth lens 122, a sixth lens 123 and a seventh lens 124 in the second lens group 120 is an aspheric lens. For instance, one closest to the aperture stop 130 among the lenses of the second lens group 120 is an aspheric lens, and a material thereof may be glass. That is to say, the fourth lens 121 may be a glass aspheric lens. Accordingly, spheric aberration and astigmatism of the fixed-focus lens 100 may be effectively controlled to provide favorable imaging quality.

In addition, in the embodiment, one closest to the aperture stop 130 among the lenses of the first lens group 110 is a spheric lens having a refractive index greater than 1.8 and an abbe number less than 35. Accordingly, chromatic aberration and field curvature of the fixed-focus lens 100 may be effectively controlled. Further, in the second lens group, the lenses having the refractive powers being negative have a refractive index greater than 1.75 and an abbe number less than 35. Accordingly, chromatic aberration and astigmatism of the fixed-focus lens 100 may be effectively controlled to provide favorable imaging quality.

More specifically, as shown in FIG. 1, in the embodiment, the first lens 111 is a convex-concave lens with a convex surface facing the magnified side, the second lens 112 is a convex-concave lens with a convex surface facing the magnified side, the third lens 113 is a biconvex lens, the fourth lens 121 is a concave-convex lens with a convex surface facing the reduced side, the fifth lens 122 is a biconcave lens, the sixth lens 123 is a biconvex lens, and the seventh lens 124 is a biconvex lens. Further, the fifth lens 122 and the sixth lens 123 form a double cemented lens.

In the embodiment, the fixed-focus lens 100 satisfies $5<|f1/f|<9$, where f1 is an effective focal length of the first lens group 110, and f is an effective focal length of the fixed-focus lens 100. Further, the fixed-focus lens 100 satisfies $2<|f2/f|<3.5$, where f2 is an effective focal length of the second lens group 120. More specifically, distortion and aberration of the fixed-focus lens 100 may be effectively controlled when the fixed-focus lens 100 satisfies $5<|f1/f|<9$, and lateral color of the fixed-focus lens 100 may be effectively corrected when the fixed-focus lens 100 satisfies $2<|f2/f|<3.5$. As such, in addition to the characteristics of miniaturizing and lightening of the fixed-focus lens 100, it is also capable of achieving the effects of wider field of view (FOV) and large aperture while maintaining the imaging quality in high resolution of the fixed-focus lens 100. Herein, the field of view of the fixed-focus lens 100 refers to double of an included angle between a light that is incident or emerged at a most marginalized edge of the first lens 111 and an optical axis. For instance, in the embodiment, the field of view of the fixed-focus lens 100 may reach 88.9° and a F-number may be as small as 1.9, thus an advantage of larger aperture is provided.

On the other hand, in the embodiment, the fixed-focus lens 100 may further utilize a collocation of materials of the lenses to inhibit the thermal drift phenomenon from influencing optical performance of the fixed-focus lens 100. Specifically, a product of a refractive power and a slope of a refractive index changing with a temperature change of any one lens of the second lens group 120 is P×(dn/dt), and a sum of P×(dn/dt) of the lenses of the second lens group 120 is less than 0. That is to say, the fixed-focus lens 100 satisfies a mathematical relation of: $(P\times dn/dt)_{lens4}+(P\times dn/dt)_{lens5}+(P\times dn/dt)_{lens6}+(P\times dn/dt)_{lens7}<0$. Herein, P is the refractive power of each lens, dn is a refractive index variation of each lens, and dt is a temperature change of each lens. Thus, dn/dt represents the slope of the refractive index changing with the temperature change. In other words, $(P\times dn/dt)_{lens4}$ is the product of the refractive power and the slope of the refractive index changing with the temperature change of the fourth lens 121, and $(P\times dn/dt)_{lens5}$, $(P\times dn/dt)_{lens6}$ and $(P\times dn/dt)_{lens7}$ are the products of the refractive powers and the slopes of the refractive index changing with the temperature change of the fifth lens 122, the sixth lens 123 and the seventh lens 124, respectively. For instance, in the embodiment, values of $(P\times dn/dt)_{lens4}$, $(P\times dn/dt)_{lens5}$, $(P\times dn/dt)_{lens6}$ and $(P\times dn/dt)_{lens7}$ are sequentially $2.9\times10^{-6}/°$ C., $2.2\times10^{-6}/°$ C., $-6.3\times10^{-6}/°$ C. and $-6.3\times10^{-6}/°$ C. Accordingly, the thermal drift phenomenon may be effectively inhibited to ensure that the fixed-focus lens 100 can maintain excellent imaging quality the within the working temperature ranged between $-10°$ C. and $50°$ C. It should be noted that, aforesaid numerical range is used only for example instead of limiting the invention.

An embodiment of the fixed-focus lens 100 is provided as follows. However, the invention is not limited to the data listed below. It should be known to those ordinary skilled in the art that various modifications and variations can be made to the structure of the invention without departing from the scope or spirit of the invention.

TABLE 1

| Surface | Surface Type | Radius of Curvature (mm) | Interval (mm) | Refractive Index | Abbe Number | Remark |
|---|---|---|---|---|---|---|
| S101 | Aspheric | 98.1 | 3.06 | 1.531 | 56.04 | First Lens 111 |
| S102 | Aspheric | 10.63 | 8.15 | | | |
| S103 | Aspheric | 35.7 | 3.08 | 1.531 | 56.04 | Second Lens 112 |
| S104 | Aspheric | 16.82 | 21.54 | | | |
| S105 | Spheric | 50.01 | 7.41 | 1.846 | 23.78 | Third Lens 113 |
| S106 | Spheric | −63.32 | 0.12 | | | |
| S107 | Spheric | Infinity | 10.93 | | | Aperture Stop 130 |
| S108 | Aspheric | −88.84 | 3.02 | 1.516 | 64.14 | Fourth Lens 121 |
| S109 | Aspheric | −19.58 | 0.13 | | | |
| S110 | Spheric | −26.73 | 1.1 | 1.785 | 26.29 | Fifth Lens 122 |
| S111 | Spheric | 22.48 | 6.1 | 1.497 | 81.55 | Sixth Lens 123 |
| S112 | Spheric | −21.2 | 0.32 | | | |

TABLE 1-continued

| Surface | Surface Type | Radius of Curvature (mm) | Interval (mm) | Refractive Index | Abbe Number | Remark |
|---|---|---|---|---|---|---|
| S113 | Spheric | 46.56 | 6.02 | 1.497 | 81.55 | Seventh Lens 124 |
| S114 | Spheric | −19.54 | 8.08 | | | |

In Table 1, "Radius of Curvature" refers to a radius of curvature of each surface, and "Interval" refers to a distance between two adjacent surfaces. For instance, "Interval" for the surface S101 is a distance from the surface S101 to the surface S102 on the optical axis. "Thickness", "Refractive Index", and "Abbe Number" corresponding to each of the lenses listed in the "Remark" column can be found in the corresponding values for the distance, refractive index, and abbe number from each row. In addition, the surfaces S101 and S102 are two surfaces of the first lens 111. The surfaces S103 and S104 are two surfaces of the second lens 112. The surfaces S105 and S106 are two surfaces of the third lens 113. The surface S107 is where the aperture stop 130 is located. The surfaces S108 and S109 are two surfaces of the fourth lens 121. The surfaces S110 is a surface of the fifth lens 122 facing the magnified side, the surfaces S111 is a surface of the sixth lens 122 in contact with the sixth lens 123, and the surfaces S112 is a surface of the sixth lens 123 facing the reduced side. The surfaces S113 and S114 are two surfaces of the seventh lens 124.

In view of above, the surfaces S101, S102, S103, S104, S108 and S109 are aspheric surfaces, and a formula of the aspheric surfaces is provided as follows.

$$Z = \frac{(1/R)H^2}{1+\sqrt{1-(1+K)(H/R)^2}} + AH^4 + BH^6 + CH^8 DH^{10} + EH^{12} + FH^{14}$$

Herein, Z is an offset along a direction of the optical axis. R is a radius of osculating sphere, which is also the radius of curvature near the optical axis (e.g., the radius of curvatures for S101, S102, S103, S104, S108 and S109 in Table 1). K is a conic constant. H is an aspheric height, which is a height from a center of the lens to an edge of the lens. In view of the formula, it can be known that different values of H are corresponding to different values of Z. A, B, C, D, E and F are aspheric coefficients. The aspheric coefficients and K values of the surfaces S101, S102, S103, S104, S108 and S109 are as shown in Table 2.

diagram made by utilizing lights with wavelengths being 460 nm, 525 nm and 615 nm, respectively, and a horizontal axis thereof refers to a distance from a focal plane and a vertical axis thereof refers to the field of view from 0 to a maximum value being 44.459°. Further, in the field curvature diagram of FIG. 2B, S represents data of a sagittal direction, and T represents data of a tangential direction. FIG. 2C is a distortion diagram made by utilizing lights with wavelengths being 460 nm, 525 nm and 615 nm, respectively, and a horizontal axis thereof refers to a distortion of a specific percentage and a vertical axis thereof refers to the field of view from 0 to a maximum value being 44.459°. FIG. 2D is a lateral color diagram made by utilizing lights with wavelengths being 460 nm, 525 nm and 615 nm, respectively, and a horizontal axis thereof refers to a distance from the wavelength of 525 nm and a vertical axis thereof refers to the field of view from 0 to a maximum value being 7.89 mm. More specifically, FIG. 2E to FIG. 2G are sequentially transverse ray fan plots of images at different field of views (with the values of 0 mm, 6 mm and 7.89 mm). Therein, a coordinate of a horizontal axis refers to a position where a light ray passes the aperture stop 130, and a vertical axis refers to a distance between a position where the light ray rendered on an image plane and a position where a chief ray rendered on the image plane. In addition, FIG. 2E to FIG. 2G are optical simulation data diagrams made utilizing a light with wavelengths being 460 nm, 525 nm and 615 nm.

As shown in FIG. 2A to FIG. 2G, the fixed-focus lens 100 shows favorable imaging quality in all aspects of longitudinal aberration, distortion, field curvature and lateral color. Therefore, the fixed-focus lens 100 of the embodiment can provide advantages of small size, large aperture and wide field of view while maintaining excellent imaging quality.

FIG. 3A to FIG. 3G are simulation data diagrams of a focal shift of the fixed-focus lens 100 respectively under different temperatures, where a horizontal axis thereof is a focal shift in units of millimeter (mm) and a vertical axis thereof is a modulus of the optical transfer function (OTF). In view of FIG. 3A to FIG. 3G, it is clear that, when the fixed-focus lens 100 is under different temperatures (e.g., −10° C., 0° C., 10° C., 20° C., 30° C., 40° C. or 50° C.) in the case where the focal shift is zero, the modulus of the

TABLE 2

| Surface | K | A | B | C | D | E | F |
|---|---|---|---|---|---|---|---|
| S101 | 9.06E−01 | 2.00E−05 | −2.94E−08 | 4.73E−11 | 5.48E−14 | −1.72E−16 | 1.10E−19 |
| S102 | −4.14E−01 | −6.20E−05 | −9.28E−08 | −1.95E−10 | −4.20E−12 | −1.11E−14 | 8.83E−17 |
| S103 | 6.10E−02 | −1.08E−04 | 2.88E−07 | 8.20E−10 | −1.38E−12 | −1.56E−14 | 4.50E−17 |
| S104 | −3.28E−02 | −4.86E−05 | 4.04E−07 | 2.20E−09 | −1.09E−11 | 6.41E−14 | −6.93E−16 |
| S108 | 3.50E+01 | −3.54E−05 | 8.45E−07 | −1.22E−08 | 6.24E−11 | 2.83E−12 | −3.09E−14 |
| S109 | 1.25E+00 | 6.78E−05 | 1.11E−06 | −2.14E−08 | 4.03E−10 | −2.86E−12 | 5.98E−15 |

Figure 2A:
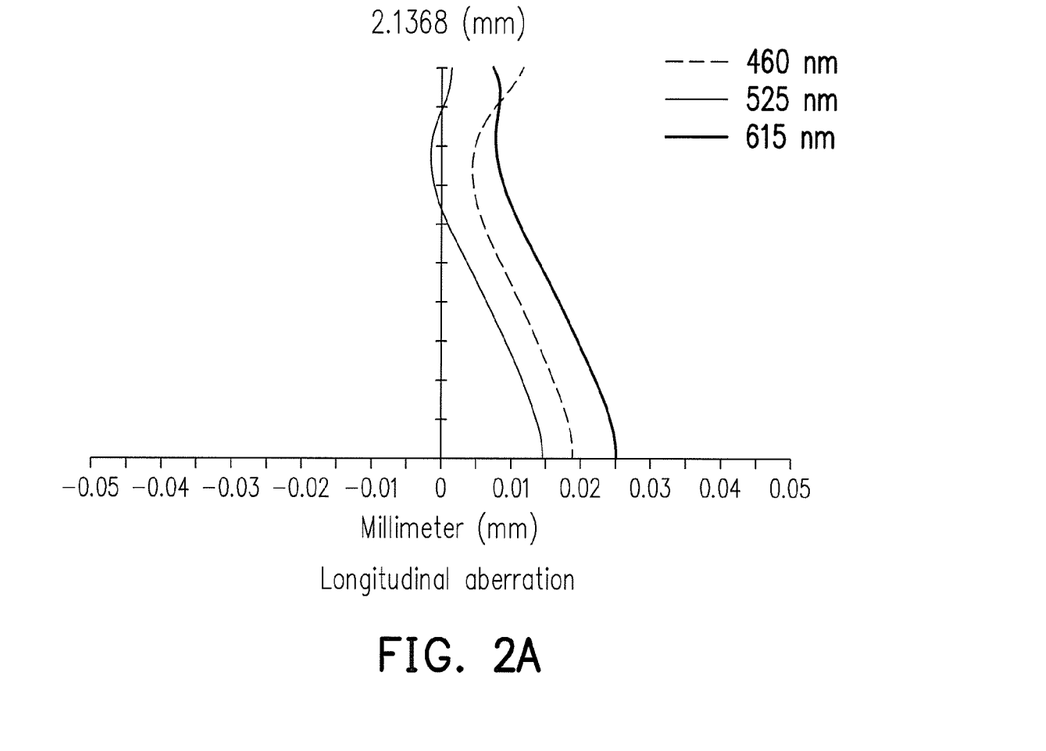
FIG. 2A to FIG. 2G are optical simulation data diagrams of the fixed-focus lens of FIG. 1.
Figures 2B, 2C:
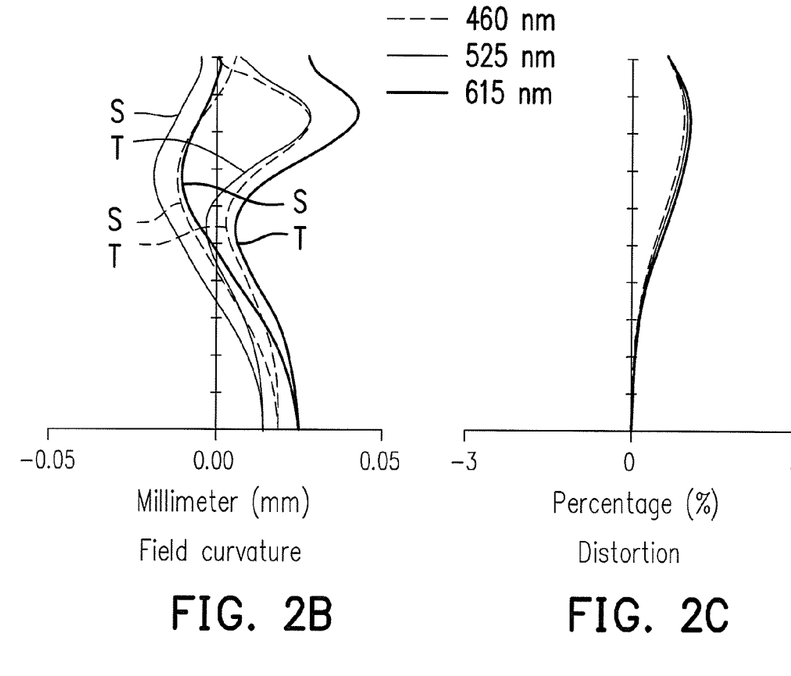
Figure 2D:
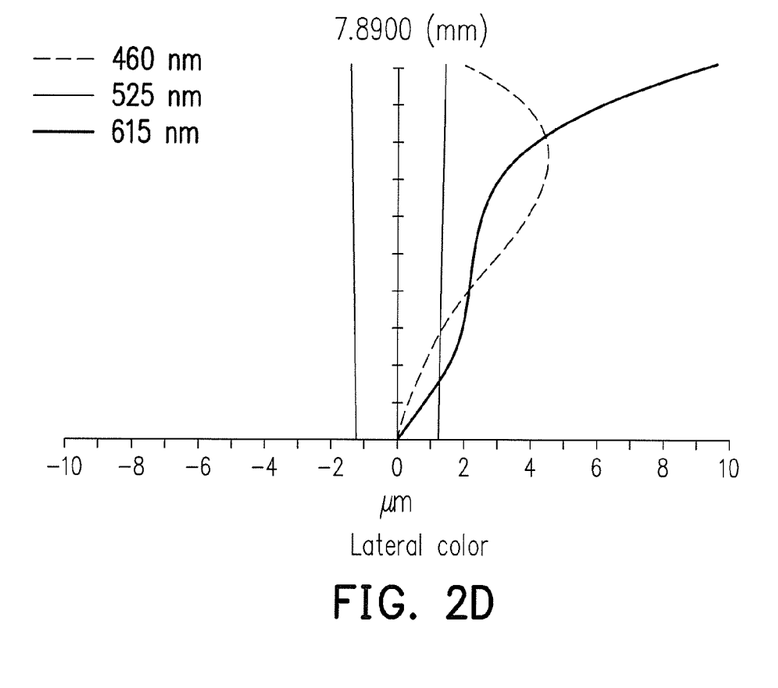
Figure 2E:
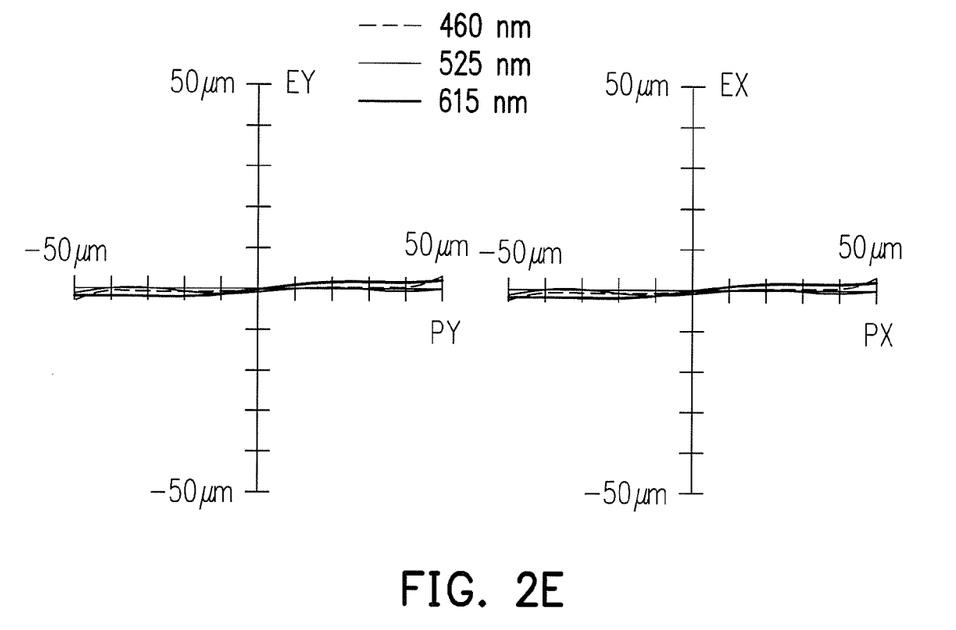
Figure 2F:
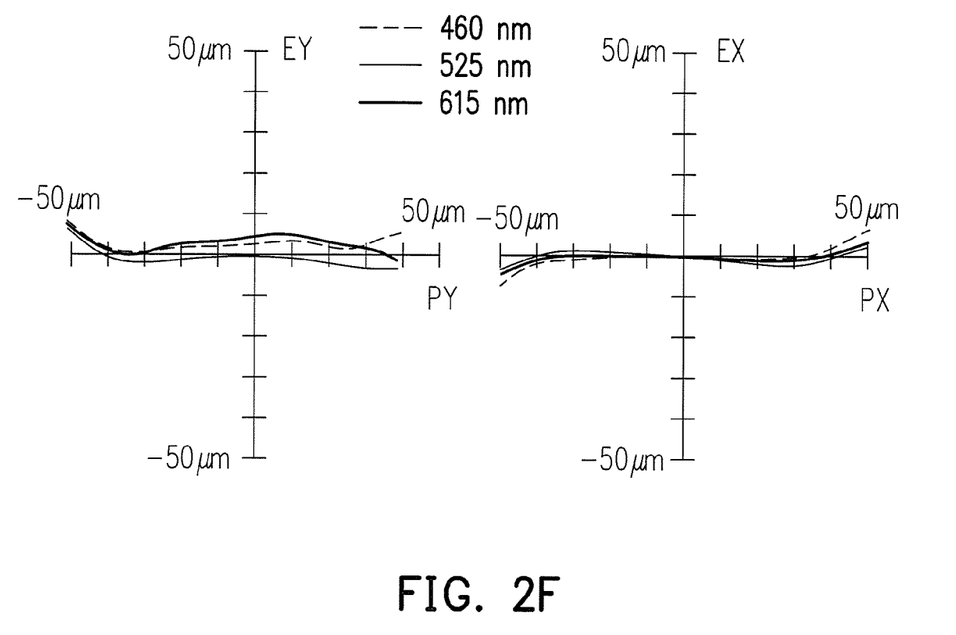
Figure 2G:
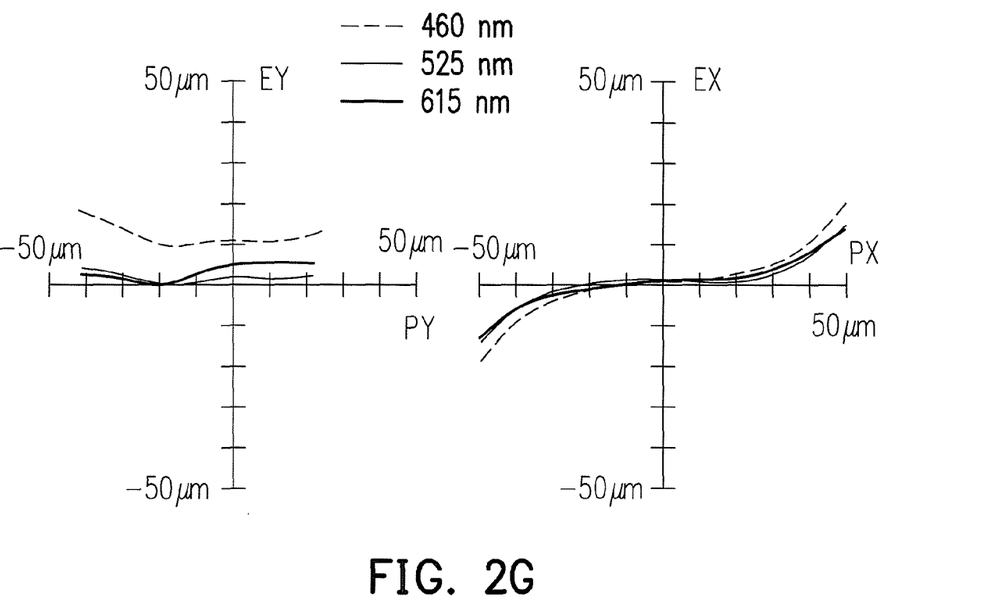
Figure 3A:
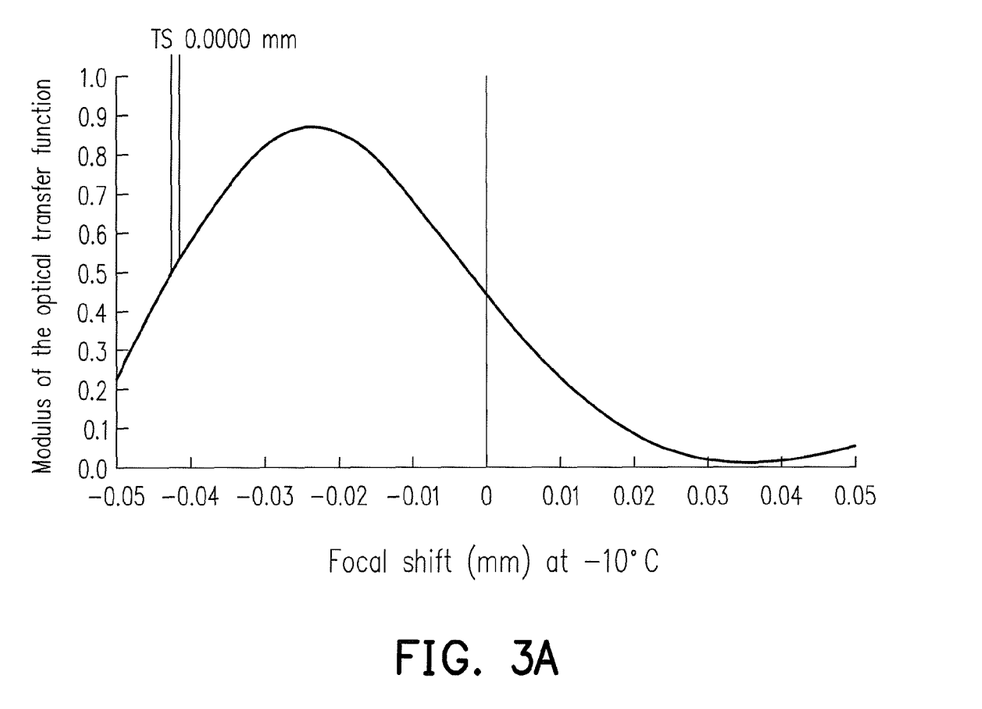
FIG. 3A to FIG. 3G are simulation data diagrams of a focal shift of the fixed-focus lens respectively under different temperatures.
Figure 3B:
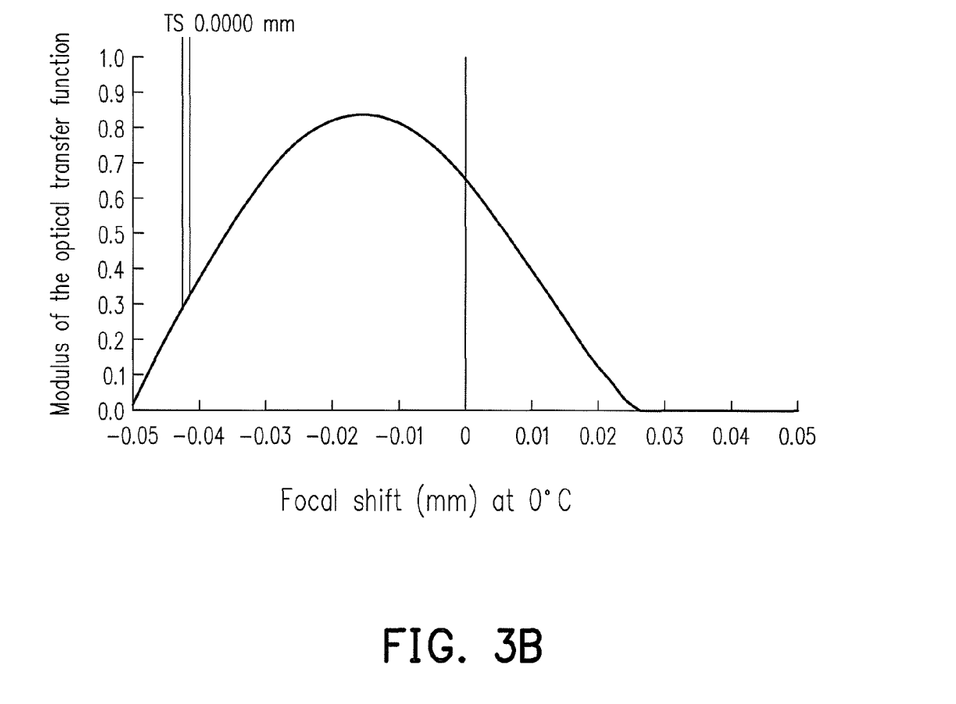
Figure 3C:
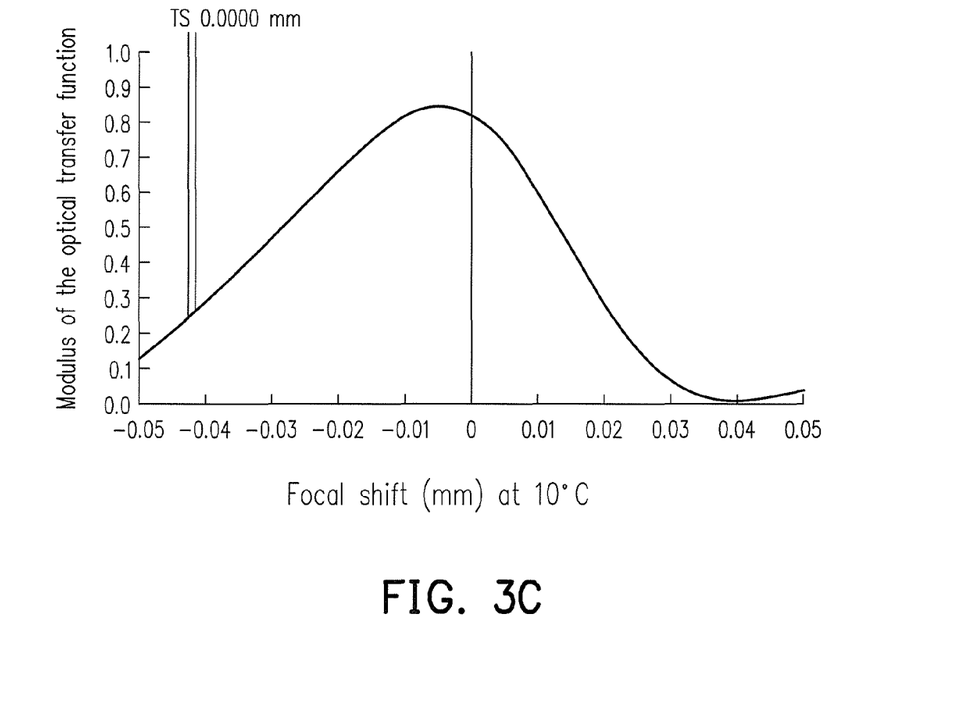
Figure 3D:
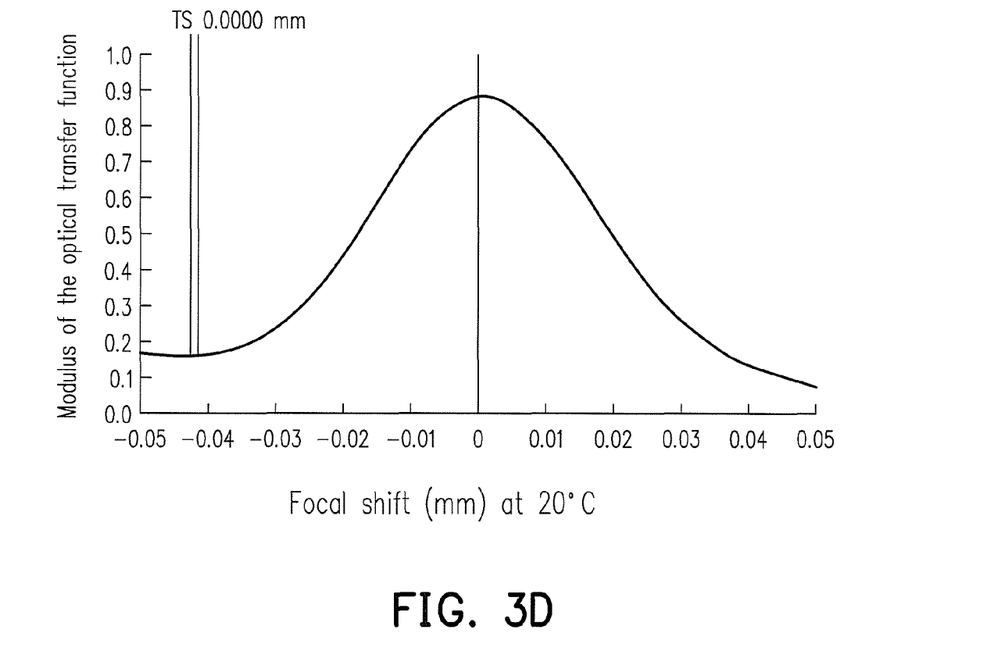
Figure 3E:
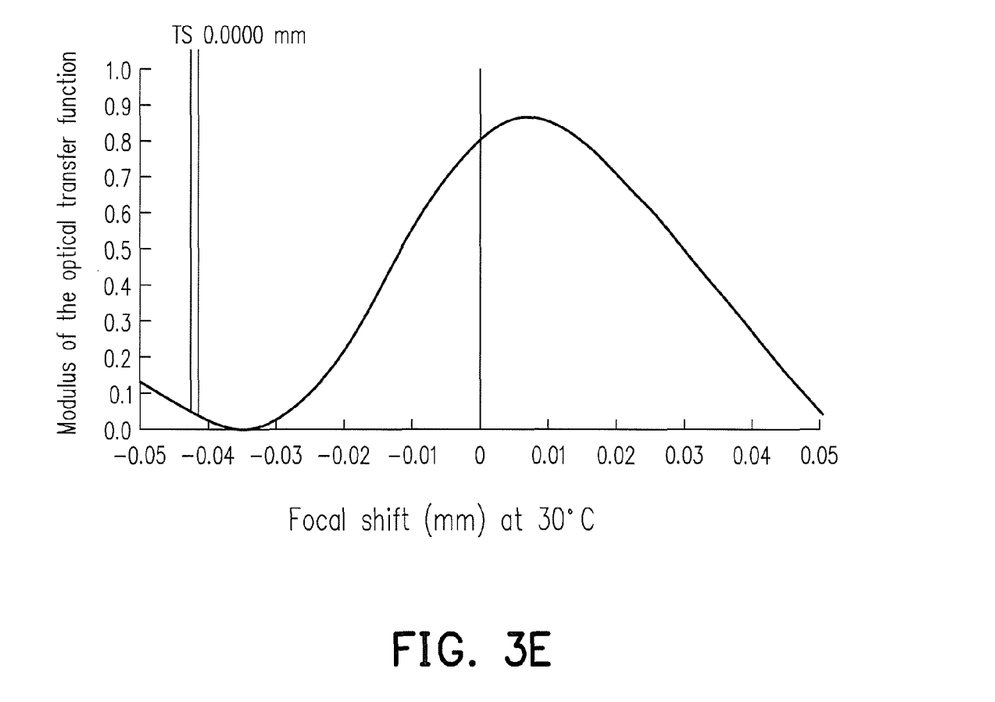
Figure 3F:
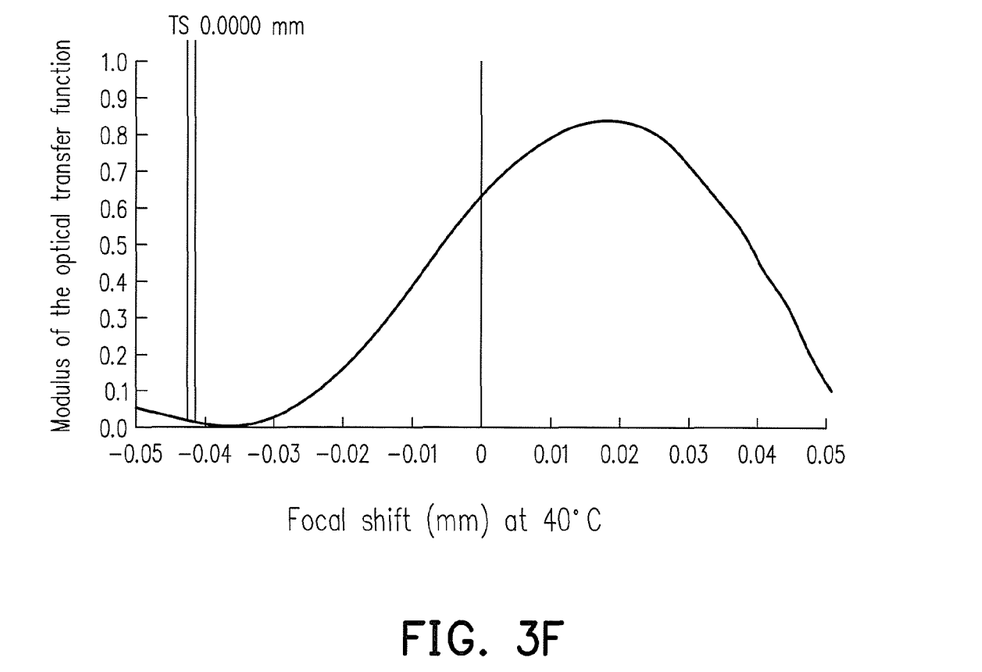
Figure 3G:
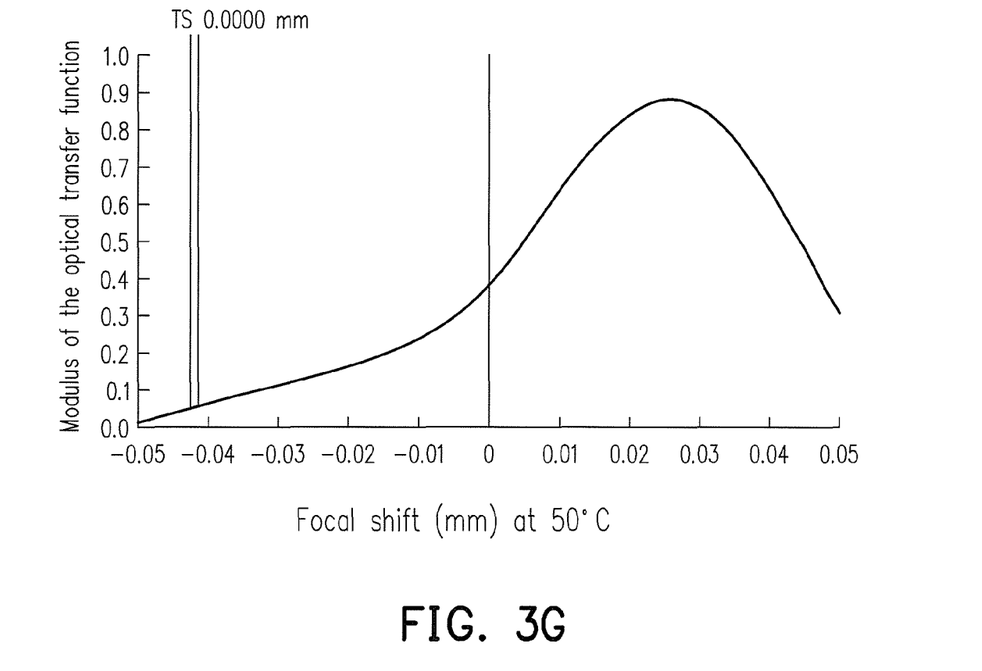

FIG. 2A to FIG. 2G are optical simulation data diagrams of the fixed-focus lens 100 of FIG. 1. FIG. 2A is a longitudinal aberration diagram made by utilizing lights with wavelengths being 460 nm, 525 nm and 615 nm, respectively, and a vertical axis thereof is the field of view ranged from 0 to a maximum value. FIG. 2B is a field curvature optical transfer function are all greater than 0.3. That is, the fixed-focus lens 100 can still maintain excellent imaging quality under different temperatures. Therefore, the fixed-focus lens 100 is also capable of inhibiting the thermal drift phenomenon from influencing optical performance of the fixed-focus lens 100 during the temperature change.

Figure 4:
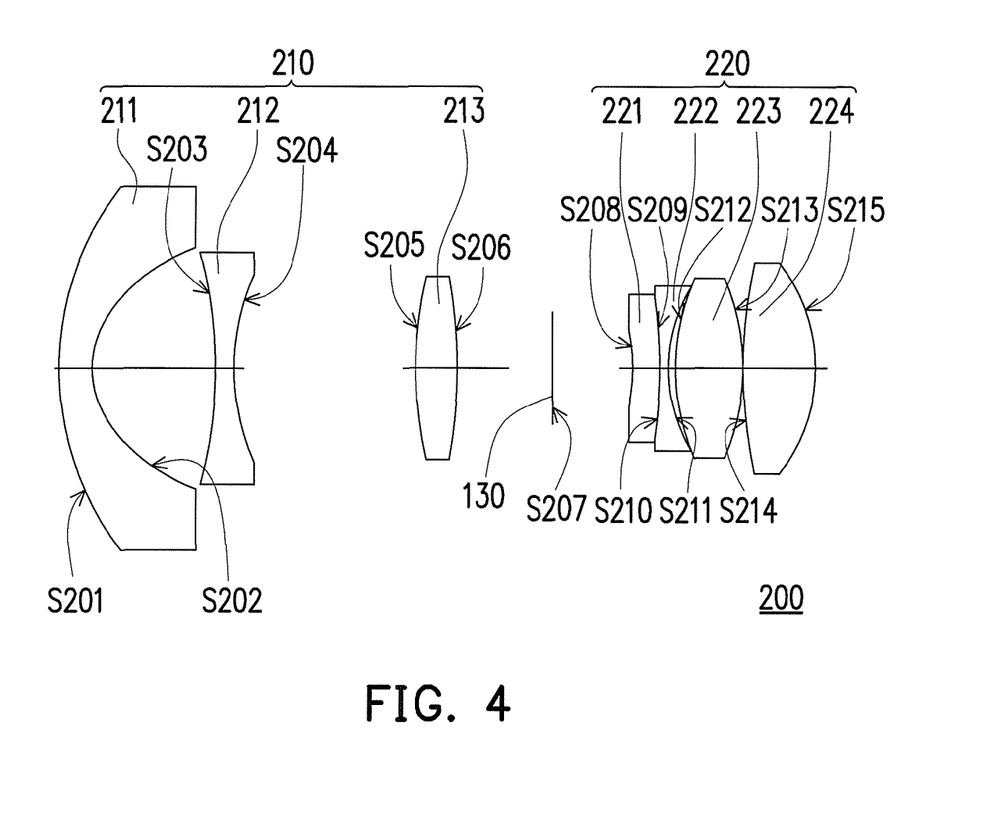
FIG. 4 is a schematic diagram of a fixed-focus lens according to another embodiment of the invention.

FIG. 4 is a schematic diagram of a fixed-focus lens according to another embodiment of the invention. Referring to FIG. 4, a fixed-focus lens 200 of the embodiment is similar to the fixed-focus lens 100 of FIG. 1, and differences between the two are described as follows. In the fixed-focus lens 200 of the embodiment, a first lens 211 of a first lens group 210 and a fourth lens 221 of a second lens group 220 are aspheric lenses, a second lens 212 is a spheric lens, and an air gap is provided between a fifth lens 222 and a sixth lens 223 which are not cemented to each other.

materials, the fixed-focus lens 200 has the same advantages of the fixed-focus lens 100, which are not repeated hereinafter.

An embodiment of the fixed-focus lens 200 is provided as follows. However, the invention is not limited to the data listed below. It should be known to those ordinary skilled in the art that various modifications and variations can be made to the structure of the invention without departing from the scope or spirit of the invention.

TABLE 3

| Surface | Surface Type | Radius of Curvature (mm) | Interval (mm) | Refractive Index | Abbe Number | Remark |
|---|---|---|---|---|---|---|
| S201 | Aspheric | 30.93 | 3.00 | 1.531 | 56.58 | First Lens 211 |
| S202 | Aspheric | 10.90 | 12.65 | | | |
| S203 | Spheric | −69.16 | 1.50 | 1.516 | 64.14 | Second Lens 212 |
| S204 | Spheric | 20.01 | 17.36 | | | |
| S205 | Spheric | 29.25 | 3.72 | 1.800 | 34.97 | Third Lens 213 |
| S206 | Spheric | −167.54 | 9.85 | | | |
| S207 | Spheric | Infinity | 7.25 | | | Aperture Stop 130 |
| S208 | Aspheric | −144.52 | 2.84 | 1.516 | 64.14 | Fourth Lens 221 |
| S209 | Aspheric | −16.08 | 0.10 | | | |
| S210 | Spheric | −19.42 | 1.00 | 1.760 | 27.51 | Fifth Lens 222 |
| S211 | Spheric | 36.02 | 0.80 | | | |
| S212 | Spheric | 64.04 | 6.35 | 1.497 | 81.55 | Sixth Lens 223 |
| S213 | Spheric | −15.50 | 0.10 | | | |
| S214 | Spheric | 149.89 | 7.03 | 1.497 | 81.55 | Seventh Lens 224 |
| S215 | Spheric | −16.98 | 7.50 | | | |

More specifically, as shown in FIG. 4, in the embodiment, the first lens 211 is a convex-concave lens with a convex surface facing the magnified side, the second lens 212 is a biconcave lens, the third lens 213 is a biconvex lens, the fourth lens 221 is a concave-convex lens with a convex surface facing the reduced side, the fifth lens 222 is a biconcave lens, the sixth lens 223 is a biconvex lens, and a seventh lens 224 is a biconvex lens.

Further, in the embodiment, the fixed-focus lens 200 may also utilize a collocation of materials of the lenses of the second lens group 220 to inhibit the thermal drift phenomenon from influencing optical performance of the fixed-focus lens 200. For instance, in the embodiment, values of $(P \times dn/dt)_{lens4}$, $(P \times dn/dt)_{lens5}$, $(P \times dn/dt)_{lens6}$ and $(P \times dn/dt)_{lens7}$ are sequentially $2.9 \times 10^{-6}/°$ C., $2.7 \times 10^{-6}/°$ C., $-6.3 \times 10^{-6}/°$ C., and $-6.3 \times 10^{-6}/°$ C. In other words, a product of a refractive power and a slope of a refractive index changing with a temperature change of any one lens of the second lens group 220 is $P \times (dn/dt)$, and a sum of $P \times (dn/dt)$ of the lenses of the second lens group 220 is also less than 0. It should be noted that, aforesaid numerical range is used only for example instead of limiting the invention.

Accordingly, the thermal drift phenomenon may be effectively inhibited to ensure that the fixed-focus lens 200 can In Table 3, "Radius of Curvature" refers to a radius of curvature of each surface, and "Interval" refers to a distance between two adjacent surfaces. For instance, "Interval" for the surface S201 is a distance from the surface S201 to the surface S202 on the optical axis. "Thickness", "Refractive Index", and "Abbe Number" corresponding to each of the lenses listed in the "Remark" column can be found in the corresponding values for the distance, refractive index, and abbe number from each row. In addition, the surfaces S201 and S202 are two surfaces of the first lens 211. The surfaces S203 and S204 are two surfaces of the second lens 212. The surfaces S205 and S206 are two surfaces of the third lens 213. The surface S207 is where the aperture stop 130 is located. The surfaces S208 and S209 are two surfaces of the fourth lens 221. The surfaces S210 and S211 are two surfaces of the fifth lens 222. The surfaces S212 and S213 are two surfaces of the sixth lens 223. The surfaces S214 and S215 are two surfaces of the seventh lens 224.

In view of the above, the surfaces S201, S202, S208 and S209 are aspheric surfaces, and a formula thereof is identical to the aspheric formula adapted for Table 1. Physical meaning of each parameter can refer to the description for Table 1, which is not repeated hereinafter. The aspheric coefficients and each value of the parameters of the surfaces S201, S202, S208 and S209 are as shown in Table 4.

TABLE 4

| Surface | K | A | B | C | D | E | F |
|---|---|---|---|---|---|---|---|
| S201 | 0.00E+00 | 1.23E−05 | 3.77E−09 | 4.70E−12 | 4.40E−15 | 1.70E−17 | 2.50E−19 |
| S202 | −3.13E−01 | 3.93E−06 | −4.95E−08 | 8.09E−10 | −2.64E−12 | −1.16E−14 | 5.43E−17 |
| S208 | 0.00E+00 | −9.21E−05 | −3.98E−07 | −3.66E−09 | 1.08E−10 | 1.71E−12 | −3.28E−14 |
| S209 | 1.84E−01 | 8.59E−05 | 4.93E−07 | −2.26E−08 | 5.96E−10 | −4.95E−12 | 1.11E−14 | maintain excellent imaging quality the within the working temperature ranged between −10° C. and 50° C. In other words, in the embodiment, since the fixed-focus lens 200 and the fixed-focus lens 100 have similar structures and In summary, the fixed-focus lens according to the embodiments of the invention satisfies the mathematical relations of $5<|f1/f|<9$ and $2<|f2/f|<3.5$, where f1 is the effective focal length of the first lens group, f2 is the effective focal length of the second lens group, and f is the effective focal length of the fixed-focus lens. In the embodiments of the invention, the product of the refractive power and the slope of the refractive index changing with the temperature change of any one lens of the second lens group is P×(dn/dt), where the sum of P×(dn/dt) of the lenses is less than 0. As such, in addition to the characteristics of miniaturizing and lightening of the lens, the effects of wider field of view and large aperture may also be achieved while maintaining the imaging quality in high resolution. Moreover, the fixed-focus lens may also utilize the collocation of materials of the lenses of the second lens group to inhibit the thermal drift phenomenon from influencing optical performance of the fixed-focus lens.

The embodiments described are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. Any of the embodiments or any of the claims of the invention does not need to achieve all of the objects, advantages or features disclosed by the invention. Moreover, the abstract and the headings are merely used to aid in searches of patent files and are not intended to limit the scope of the claims of the invention. In addition, the terms such as "first", "second" as recited in the specification or the claims are intended to give the elements names or distinguish different embodiments or scopes, the maximum number or the minimum number of the elements is not limited thereto.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fixed-focus lens, comprising:
   a first lens group having a positive refractive power, and including a first lens, a second lens and a third lens arranged in sequence from a magnified side to a reduced side;
   a second lens group having a positive refractive power, and including a fourth lens, a fifth lens, a sixth lens and a seventh lens arranged in sequence from the magnified side to the reduced side, wherein a product of a refractive power and a slope of a refractive index changing with a temperature change of any one lens of the second lens group is P×(dn/dt), and a sum of P×(dn/dt) of the lenses of the second lens group is less than 0; and
   an aperture stop, disposed between the first lens group and the second lens group.

2. The fixed-focus lens according to claim 1, wherein refractive powers of the first lens, the second lens, and the third lens are sequentially negative, negative and positive.

3. The fixed-focus lens according to claim 1, wherein refractive powers of the fourth lens, the fifth lens, the sixth lens and the seventh lens are sequentially positive, negative, positive and positive.

4. The fixed-focus lens according to claim 1, wherein the fixed-focus lens satisfies $5<|f1/f|<9$, wherein f1 is an effective focal length of the first lens group, and f is an effective focal length of the fixed-focus lens.

5. The fixed-focus lens according to claim 1, wherein the fixed-focus lens satisfies $2<|f2/f|<3.5$, wherein f2 is an effective focal length of the second lens group, and f is an effective focal length of the fixed-focus lens.

6. The fixed-focus lens according to claim 1, wherein at least one of the first lens, the second lens and the third lens is an aspheric lens, and at least one of the fourth lens, the fifth lens, the sixth lens and the seventh lens is an aspheric lens.

7. The fixed-focus lens according to claim 1, wherein a material of at least one of the first lens, the second lens and the third lens is plastic.

8. The fixed-focus lens according to claim 1, wherein one closest to the aperture stop among the lenses of the first lens group is a spherical lens having a refractive index greater than 1.8 and an abbe number less than 35.

9. The fixed-focus lens according to claim 1, wherein one closest to the aperture stop among the lenses of the second lens group is an aspheric lens.

10. The fixed-focus lens according to claim 1, wherein a material of one closest to the aperture stop among the lenses of the second lens group is glass.

11. The fixed-focus lens according to claim 1, wherein the lenses having the refractive powers being negative have a refractive index greater than 1.75 and an abbe number less than 35 in the second lens group.

12. The fixed-focus lens according to claim 1, wherein the fifth lens and the sixth lens form a double cemented lens.

13. The fixed-focus lens according to claim 1, wherein the first lens is a convex-concave lens with a convex surface facing the magnified side, the second lens is a convex-concave lens with a convex surface facing the magnified side, the third lens is a biconvex lens, the fourth lens is a concave-convex lens with a convex surface facing the reduced side, the fifth lens is a biconcave lens, the sixth lens is a biconvex lens, and the seventh lens is a biconvex lens.

14. The fixed-focus lens according to claim 1, wherein the first lens is a convex-concave lens with a convex surface facing the magnified side, the second lens is a biconcave lens, the third lens is a biconvex lens, the fourth lens is a concave-convex lens with a convex surface facing the reduced side, the fifth lens is a biconcave lens, the sixth lens is a biconvex lens, and the seventh lens is a biconvex lens.

15. The fixed-focus lens according to claim 1, wherein the first lens and the fourth lens are aspheric lenses.

16. The fixed-focus lens according to claim 15, wherein the second lens is an aspheric lens.

* * * * *